(12) United States Patent
Chabaud et al.

(10) Patent No.: US 9,958,534 B2
(45) Date of Patent: May 1, 2018

(54) DETERMINATION OF AN INDICATOR FOR A BLINDNESS OF A RADAR SENSOR

(71) Applicant: Robert Bosch GmbH, Stuttgart (DE)

(72) Inventors: Maija Chabaud, Ludwigsburg (DE); Goetz Kuehnle, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 441 days.

(21) Appl. No.: 14/707,539

(22) Filed: May 8, 2015

(65) Prior Publication Data

US 2015/0338508 A1 Nov. 26, 2015

(30) Foreign Application Priority Data

May 22, 2014 (DE) .................. 10 2014 209 723

(51) Int. Cl.
*G01S 7/40* (2006.01)
*G01S 13/93* (2006.01)
*G01S 13/34* (2006.01)

(52) U.S. Cl.
CPC .......... *G01S 7/4004* (2013.01); *G01S 7/4056* (2013.01); *G01S 13/343* (2013.01); *G01S 13/345* (2013.01); *G01S 13/931* (2013.01); *G01S 2007/4039* (2013.01); *G01S 2007/4082* (2013.01)

(58) Field of Classification Search
CPC .. G01S 7/40; G01S 7/4004; G01S 2007/4039; G01S 2007/4043; G01S 2007/4047; G01S 13/931
See application file for complete search history.

(56) References Cited

U.S. PATENT DOCUMENTS

| 6,124,823 | A  | * | 9/2000  | Tokoro   | G01S 7/2927 342/128 |
| 6,348,889 | B1 | * | 2/2002  | Ashihara | G01S 7/4004 342/70  |
| 6,469,659 | B1 | * | 10/2002 | Lajiness | G01S 7/4004 342/159 |
| 6,954,172 | B2 | * | 10/2005 | Hofmann  | G01S 7/4004 342/165 |
| 7,486,222 | B2 | * | 2/2009  | Matsuoka | G01S 7/4004 342/165 |

(Continued)

FOREIGN PATENT DOCUMENTS

| DE | 199 45 268     | 3/2001 |
| WO | WO 2010/097137 | 9/2010 |
| WO | WO 2010/099988 | 9/2010 |

*Primary Examiner* — Peter M Bythrow
(74) *Attorney, Agent, or Firm* — Norton Rose Fulbright US LLP; Gerard Messina

(57) ABSTRACT

A method for determining an indicator for a blindness of a radar sensor, includes: controlling the radar sensor to transmit a transmission signal in the form of at least two successive frequency ramps having the same ramp slope and in the same frequency range, and to receive detection signals associated with the frequency ramps; examining, for multiple frequencies, whether a ratio between the received powers in the frequency spectra of the received signals, at a respective frequency, corresponds to a ratio between the transmission powers of the associated frequency ramps; and determining an indicator for a blindness of the radar sensor based on the result of the examinations.

11 Claims, 3 Drawing Sheets

(56) References Cited

U.S. PATENT DOCUMENTS

| | | | | |
|---|---|---|---|---|
| 8,581,774 B2* | 11/2013 | Heilmann | ................. | G01S 7/41 |
| | | | | 342/159 |
| 8,749,429 B2* | 6/2014 | Heilmann | ............. | G01S 7/4004 |
| | | | | 342/26 D |
| 9,140,780 B2* | 9/2015 | Heilmann | ............. | G01S 7/4004 |
| 2003/0071753 A1* | 4/2003 | Vacanti | ................. | G01S 7/4004 |
| | | | | 342/173 |
| 2007/0040727 A1* | 2/2007 | Matsuoka | ............. | G01S 7/4004 |
| | | | | 342/70 |
| 2009/0243912 A1* | 10/2009 | Lohmeier | ............. | G01S 7/4004 |
| | | | | 342/70 |
| 2010/0309041 A1* | 12/2010 | Hassen | .................. | G01S 7/411 |
| | | | | 342/26 R |
| 2011/0298656 A1* | 12/2011 | Bechler | ................ | G01S 13/931 |
| | | | | 342/26 R |
| 2012/0032838 A1* | 2/2012 | Heilmann | ............. | G01S 7/4004 |
| | | | | 342/192 |
| 2012/0032840 A1* | 2/2012 | Heilmann | ................ | G01S 7/41 |
| | | | | 342/26 R |
| 2012/0050093 A1* | 3/2012 | Heilmann | ............. | G01S 7/4004 |
| | | | | 342/173 |

* cited by examiner

DETERMINATION OF AN INDICATOR FOR A BLINDNESS OF A RADAR SENSOR

BACKGROUND OF THE INVENTION

1. Field of the Invention

The present invention relates to a method for determining an indicator for a blindness of a radar sensor, as well as to a radar sensor including a control and evaluation unit which is designed to carry out a method for determining an indicator for a blindness of the radar sensor.

2. Description of the Related Art

Published German patent application document DE 199 45 268 A1 describes a method and a device for the soiling and/or blindness detection of a sensor based on at least two indicators, which are formed from the signals received and/or transmitted by the sensor. The following indicators are provided: the mean angle quality of all objects detected by the system, the rate of detection failures of a target object selected for a vehicle longitudinal controller, a mean power of the signals received by the sensor, the total of all objects detected by the system during a measurement, the linkage of distance and amplitude of the detected object which is the farthest, as well as the road reflections detected by the system. For the determination of the mean power of the received signals, the power of all detected peaks in the spectrum of the received signals is added up and a mean value is formed.

Published international patent application document WO 2010/099988 A1 describes a radar sensor having a blindness detection device, a switchover between a measuring mode for the position finding of radar targets and a test mode being carried out. In the test mode, the control of the radar sensor is carried out on the basis of parameters which are optimized for the blindness detection device. If the radar sensor does not locate any preceding vehicles or objects of a similar size, a test for the detection of blindness may include the temporary increase in the range of the radar sensor. In additional examples it is examined whether the so-called "ground clutter" may be demonstrated or whether the so-called "rain clutter" is detected. In one example, the power is varied in the test mode between a higher value on a modulation ramp and a lower value on a different modulation ramp. In this way, states in which the sensitivity of the radar sensor is reduced are to be detected more sensitively and more reliably. A comparison between the signals, which are received in the test mode on the one hand at high power and on the other hand at a decreased power, is to make the sensitivity indicators more apparent and to make the blindness detection more robust against temperature and aging effects, which influence the behavior of the transceiver electronics.

A method for the detection of sensitivity losses of an FMCW radar locating device by diffuse sources of loss is known from published international patent application document WO 2010/097137 A1, in which the power of the transmission signal is varied cyclically, respectively after the completion of a modulation ramp, and a sensitivity loss is determined based on differences in the power features of signals which are received in successive modulation ramps with identical modulation. In one example, the total received transmission power for two identical modulation ramps having different power is integrated throughout a large subarea of the respective spectrum, and by subtracting a medium noise power, a signal power which is part of the peaks in the spectrum is determined. Their ratio to the noise power is calculated. In the case of a non-blinded sensor, these signal-noise-power ratios differ from zero for those two spectra and differ by a factor which corresponds to the ratio of the transmission signal powers divided by the ratio of the noise powers. In the case of blindness, both signal-noise power ratios are to become zero.

BRIEF SUMMARY OF THE INVENTION

The object of the present invention is to provide a radar sensor, in particular a radar sensor for motor vehicles, which enables an improved detection of a blindness of the radar sensor.

A contribution to achieving this object is made according to the present invention by a method for determining an indicator for a blindness of a radar sensor which includes:
  controlling the radar sensor in order to transmit a transmission signal in the form of at least two successive frequency ramps having the same ramp slope and in the same frequency range, and to receive detection signals associated with the frequency ramps,
  examining, for multiple frequencies, whether a ratio between the received powers in the frequency spectra of the received signals at a respective frequency corresponds to a ratio of the transmission powers and the associated frequency ramps, and
  determining an indicator for a blindness of the radar sensor based on the result of the examinations.

Furthermore, a contribution to achieving this object is made according to the present invention by a radar sensor having a control and evaluation unit which is designed to carry out the mentioned method.

In this way, relative measurements are carried out by evaluating received powers of the received signals relative to one another. It is in particular examined whether a ratio between the transmission powers of the frequency ramps is mirrored in a corresponding ratio between the received powers of the detection signals, in this case in particular the ratio between the received powers at a respective frequency being examined.

The amount of the frequencies to be examined of the frequency spectra of the received signals may include all or a part of the discrete frequencies for which the frequency spectrum is received. Preferably, the examinations are carried out for an area of the frequencies above a lower limit, for example, corresponding to an evaluable area of the spectrum. The lower limit may, for example, be a CFAR (Constant False Alarm Rate) threshold value. A CFAR threshold value may be determined for each frequency spectrum, for example. For example, according to a CFAR method, a threshold value is calculated in such a way that the error probability of a noise peak being interpreted as a radar reflex is constantly held low.

Directly examining the power ratios between the detection signals associated with the frequency ramps for the individual frequencies in the discrete frequency spectrum results in a simple calculation and at the same time a high accuracy when evaluating the frequency spectra. By, for example, directly calculating the power quotients for the individual frequencies, in particular an integration of powers across a frequency range is not necessary. The method is thus very simple and robust. The possible plurality of the evaluated frequencies may also contribute to the robustness.

Preferably, a time interval between the successively transmitted frequency ramps of the transmission signal is so low, or the frequency ramps of the transmission signal are transmitted at close time intervals so that in situations with an object scenario of at least one detected object, the object scenario is essentially unchanged. When the frequency ramps of the transmission signal are transmitted at close time intervals, the associated parts of the transmission signals are essentially subject to the same transmission influences, so that the associated detection signals of the radar reflexes essentially correspond to an unchanged object constellation. In this way, power peaks appear in the frequency spectra of the received signals in the respective received signals assigned to the frequency ramps at essentially the same frequencies. In situations with at least one radar reflex, a relatively accurate correlation of the frequency positions of the peaks is thus expected in the frequency spectra of the received signals due to the time correlation of the radar reflexes in the received signals which are associated with the respective frequency ramps.

When a peak is detected in a first frequency spectrum at a frequency position k, which corresponds to a radar reflex of a detected object, it is to be expected that a corresponding peak is also present in a frequency spectrum of the next frequency ramp of the transmission signal, and it is to be expected that the detection powers at the particular frequency k correspond in their ratio between the first measurement on the one hand and the second measurement on the other hand to the ratio between the transmission power of the first measurement and the second measurement.

However, in the case of a radar sensor being soiled or covered by some other coating, in which the radar sensor essentially receives noise, no correlation is to be expected between the positions of the "peaks" of the noise between successive frequency ramps. In this way, even in situations with few or only one detected object or objects from which a radar reflex is received, a situation with object detection may be differentiated from a blindness situation without detection of an object.

For example, an indicator for a blindness of the radar sensor may be formed which indicates a degree of agreement of the mentioned power ratios.

Preferably, the step of examining includes: Examining, for multiple frequencies, whether quotients of the received powers in the frequency spectra of the received signals correspond at a respective frequency to the ratio of the transmission powers of the associated frequency ramps. This may be carried out, for example, by calculating the corresponding quotient for a respective frequency from the received powers of two frequency spectra of the received signals and comparing it to the quotient of the transmission powers of the associated frequency ramps.

The method may include: Repetition of the steps of controlling the radar sensor and the examining, and verification of the determined indicator based on the result of the repeated examinations.

DETAILED DESCRIPTION OF THE INVENTION

Figure 1:
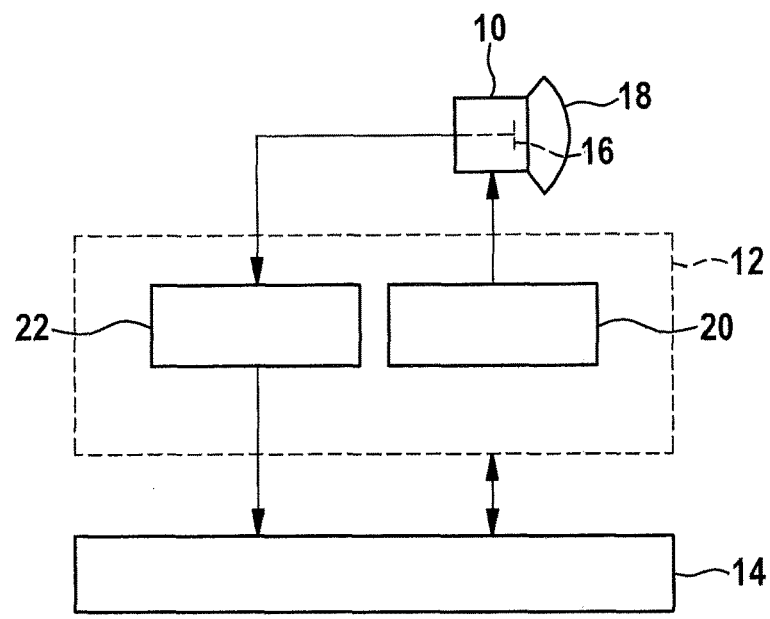
FIG. 1 shows a schematic representation of a radar sensor including a control and evaluation unit.

The radar sensor shown in FIG. 1 has a transceiver unit 10 and an associated control and evaluation unit 12. This unit may, for example, be designed to supply information about surrounding traffic to a driver assistance system 14, for example, an adaptive cruise control system (ACC) in a motor vehicle. Transceiver unit 10 includes at least one antenna 16, which is fed by control and evaluation unit 12 with a signal to be sent and which transfers the received signals to control and evaluation unit 12 for evaluation. A so-called radome 18, i.e., a covering, which is to protect antenna 16 and the connected electronic components from weather conditions, is situated at a distance from antenna 16. In some cases, the function of radome 18 is also fulfilled by a radar lens, which bundles the transmitted and received radar radiation.

Figure 2:
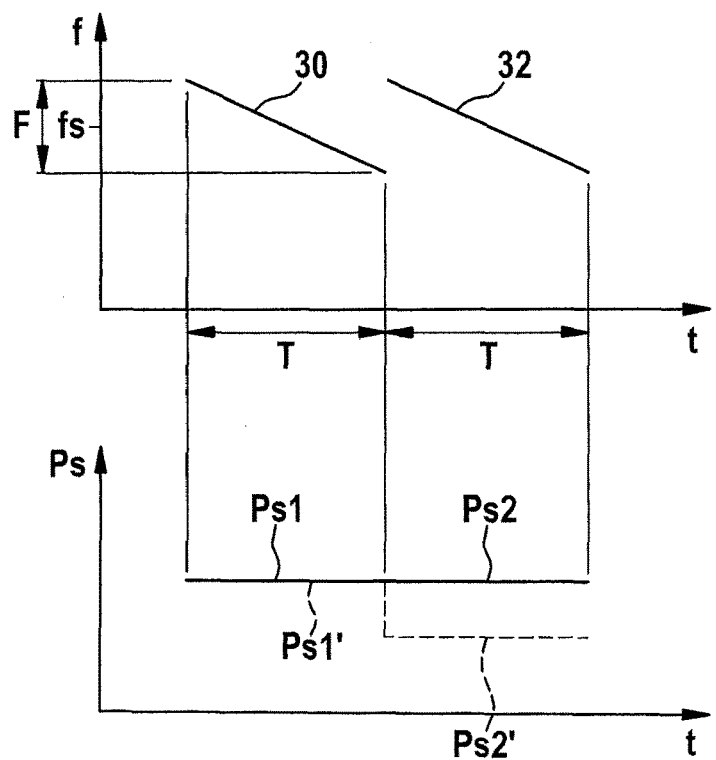
FIG. 2 shows a schematic representation of a transmission signal.

Control and evaluation unit 12 is formed by an electronic data processing system and includes a driver 20 for controlling transceiver unit 10. The radar sensor is an FMCW radar sensor, in which frequency f of the radar signal sent by antenna 16 is modulated in a ramp-shaped manner, as schematically shown in FIG. 2. In the upper part of FIG. 2, frequency f is plotted over time t.

Figure 3:
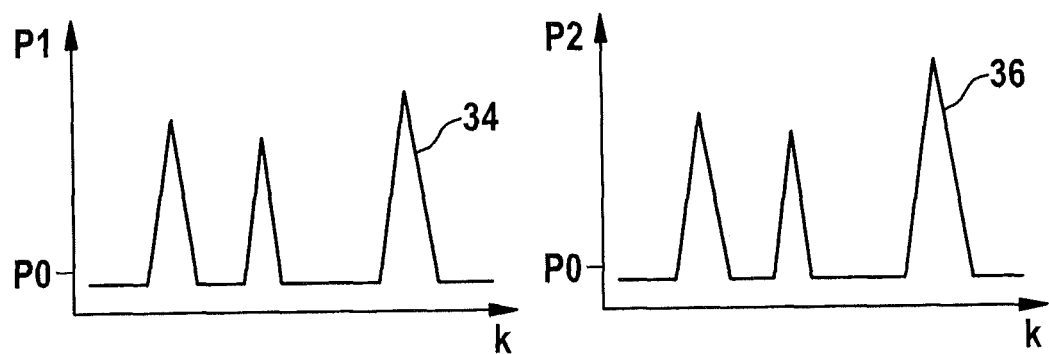
FIG. 3 shows a schematic representation of frequency spectra of received signals.

The radar echo received from a radar target, for example, a preceding vehicle, is mixed with the transmitted signal within transceiver unit 10 with the aid of a mixer so that a baseband signal is obtained, whose frequency corresponds to the frequency difference between the transmitted and the received signal. This baseband signal is transmitted to an evaluating part 22 of control and evaluation unit 12 and sampled there respectively across duration T of a frequency ramp. The time signal sampled in this way is then transformed by fast Fourier Transform (FFT) into a frequency spectrum. In this spectrum, a radar reflex, which, for example, is associated with a located radar object, appears in the form of a peak at a certain frequency position, as schematically shown in FIG. 3. There, power P is plotted over frequency position k. Frequency position k is in this case a dimensionless variable which indicates a so-called frequency bin. The numbers of the frequency bins correspond, except for a normalization constant, to the different frequencies of the spectrum and thus to half of the number of the samples. The number of the samples is, for example, 512, 1024, 2048, etc.

The determination of an indicator for a blindness of a radar sensor is carried out as described below, for example.

FIG. 2 schematically shows a used transmission signal having two identical frequency ramps 30, 32, which each have a duration T and a frequency deviation F and thus a slope M=F/T. The center frequencies fs of ramps 30, 32 are also identical.

In the lower part of FIG. 2, the transmission power Ps is plotted over time t. Ramps 30, 32 are respectively transmitted at a constant transmission power Ps1 and Ps2. In the illustrated example, the transmission powers of the two ramps 30, 32 are identical. However, different transmission powers Ps1 and Ps2 may also be used for the different ramps 30, 32, as shown in FIG. 2 with a dashed line for transmission powers Ps1', Ps2'.

The frequency position of a detected radar reflex at a distance d and at a relative velocity v equals k=(2/ c) (d* F+v*fs*T.) The speed of light is c, F is the ramp deviation and fs is the center frequency.

FIG. 3 schematically shows two frequency spectra which are obtained for ramps 30 and 32. As an example, peaks 34 are shown in the first frequency spectrum and peaks 36 in the second frequency spectrum.

For each k above a lower limit, a quotient from power P1(k) and power P2(k) is now calculated as Q(k)=P2(k)/P1(k). Optionally, only those values k are taken into account where P1 as well as P2 are above a threshold value P0, for example, a CFAR detection threshold.

For example, mean value Q of the calculated quotient Q(k) is determined. As an indicator for a blindness, for example, the deviation of mean quotient Q from expected quotient A is used.

Mean quotient Q is, for example, normalized to expected quotient A, which is equal to the ratio of the transmission powers of the respective frequency ramps: A=Ps2/Ps1. Optionally, the individual received powers of the frequency spectra with the expected quotient may be normalized according to the ratio of the transmission powers of the assigned frequency ramps; instead of P2(k), for example, P2(k)/A is then used for the evaluation explained here and below. The expected ratio between powers P2(k)/A and P1(k) is then correspondingly equal to 1. Unless indicated otherwise, the case of powers not normalized to A is explained in the following, so that a power ratio A is to be expected.

The described measurement may be repeated at a later point in time in order to verify the determined indicator. If it is found in more than one measurement that the mean quotient corresponds to the expected quotient, the non-blindness of the radar sensor may be detected with greater reliability.

The present invention makes use of the fact that a high time correlation of the detected peaks is present in the different frequency ramps in a non-blinded sensor so that for each individual frequency bin k, the ratio between received powers P2(k)/P1(k) approximately corresponds to ratio A between the transmission powers. In the case of a blinded sensor, in which, for example, noise is measured in the form of random detection, such an immediate time correlation is not given.

The described method thus enables a differentiation between the case of a detection of a peak related to an object and a blindness of a sensor, even in the case of a quotient A of the transmission powers of two frequency ramps of 1 or approximately 1.

Figure 4:
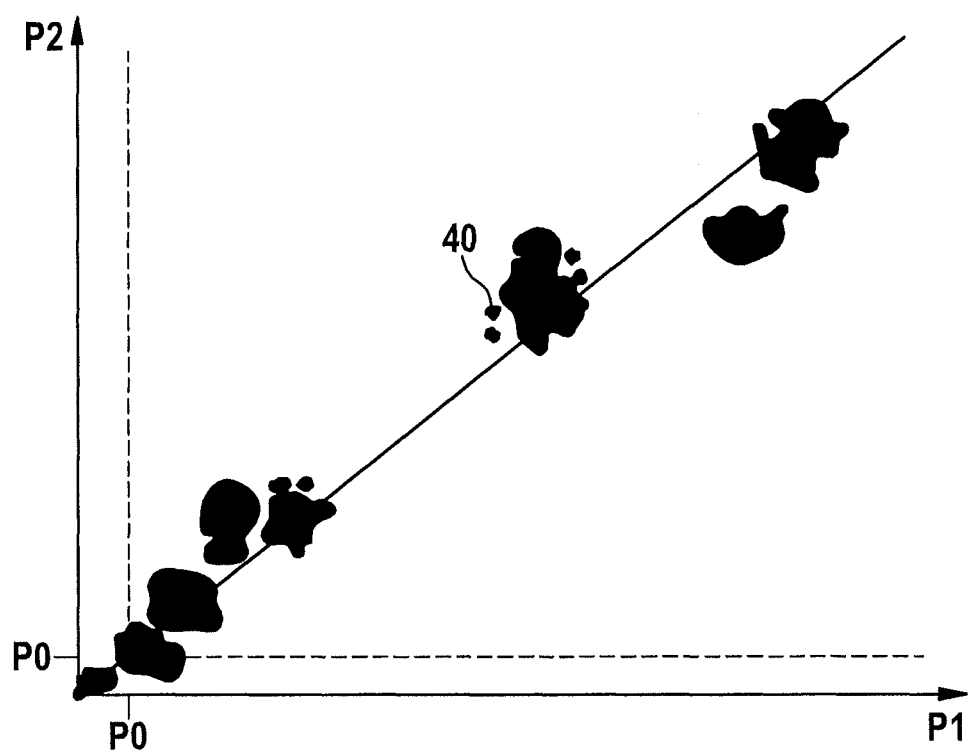
FIG. 4 shows a schematic representation for explaining the evaluation of the frequency spectra.

FIG. 4 schematically shows the correlation of received powers of peaks. The absolute received powers of two frequency ramps are plotted on the axes. FIG. 4 shows the received powers in a plurality of frequency bins as power coordinates. Respectively for one frequency bin k, the received powers present in the same frequency bin k are shown in the first frequency ramp as x coordinate, and the received powers are shown in the second frequency ramp as y coordinate.

As to be expected for the case of a non-blinded sensor, the ratio of the received powers at a respective k corresponds approximately to the ratio of the transmission powers, and, accordingly, the obtained power coordinates are approximately situated on a straight line with slope A.

Figure 5:
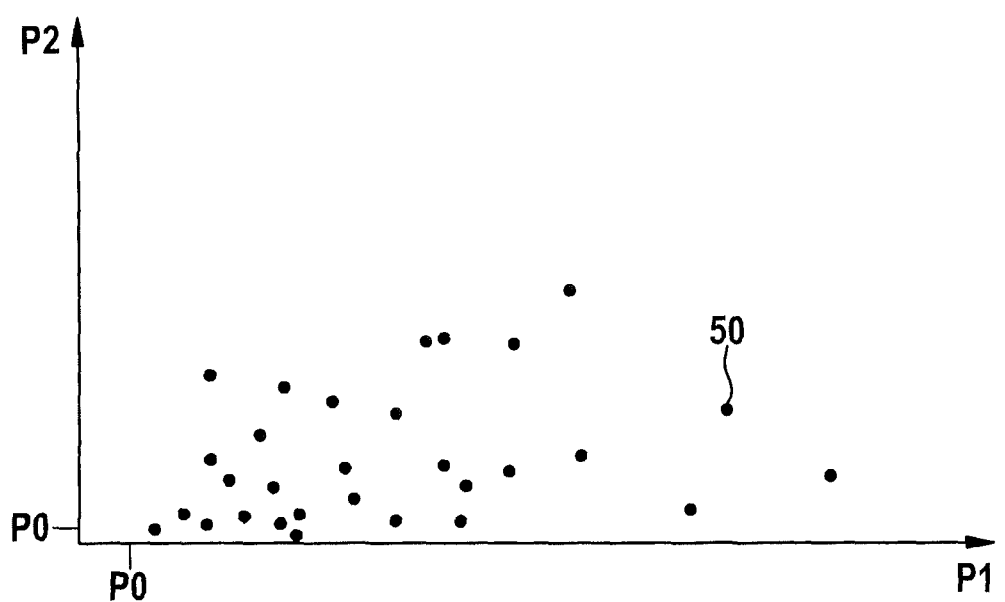
FIG. 5 shows a schematic representation for explaining the evaluation in the case of a blinded radar sensor.

In comparison, FIG. 5 schematically shows a corresponding diagram for the case of a completely blinded radar sensor. In the case of blindness, noise peaks appear only sporadically above threshold value P0 in the form of the CFAR detection threshold. Received powers 50 measured for the respective frequency bins k show no time correlation between the frequency ramps. Individual quotients Q(k) therefore show no strong deviation from ratio A.

In addition to the examination of the agreement of ascertained mean quotient Q of the received powers with quotient A of the transmission powers, the variance of ascertained quotients Q(k) of the received powers over the evaluated frequency ramps of the frequency range may be taken into account for the ascertainment of a degree of agreement of quotients Q(k) with expected quotient A. In the example of FIG. 4, the respective quotients Q(k) respectively lie at essentially the expected slope, quotient A, while in the example of FIG. 5, individual quotients Q(k) scatter widely. Thus the deviation of the mean quotient Q and the variance of the deviations of the individual values of two components may form two components of a blindness indicator. The variance may be calculated, for example, with reference to the deviations from mean value Q of the quotients, or with reference to the deviations from expected quotient A. For example, the variance of individual quotients Q(k) normalized to the ratio A of the transmission powers may be calculated. By taking the variance into account, for example, in the case of a sensor blindness, an occasionally occurring random agreement of mean quotient Q with expected quotient A may be detected and a blindness of the sensor may be nevertheless inferred immediately.

Since the expected result for the individual quotients Q(k) is established independently of the result of the measurements, other evaluation methods are also conceivable for the examination.

For example, the number of deviations of quotients Q(k) from expected value A exceeding a predefined fluctuation range may be determined. For example, this number divided by the number of the evaluated frequency bins may be used as an indicator.

Furthermore, it is conceivable, for example, to compare a first power spectrum of received power P1(k) with the additional power spectrum P2(k), the additional power spectrum optionally being normalized to the quotient A expected for the power ratio. The comparison takes place by element, i.e., for individual frequency positions k. For example, a degree of agreement of power spectra P1(k) and P2(k)/A may be directly evaluated without quotients between the obtained received powers needing to be calculated. The examination of whether a ratio between received powers P1(k), P2(k) in the frequency spectra of the receiving signals at the respective frequency k corresponds to ratio A between transmission powers Ps1, Ps2 of the associated frequency ramps 30, 32, thus takes place via a comparison of the received powers normalized to quotient A.

If, during the evaluation of the power spectra, received powers below a threshold value P0 depicted in FIG. 4 with dashed lines remain unconsidered, small received powers which are on the level of the noise level may remain unconsidered, for example, for the determination of the respective quotients Q(k) of the received powers.

Provided that the ramp duration is short enough that via the measurement with at least two frequency ramps a practically stationary object constellation is present, at least one of the frequency ramps may be part of a radar measurement in the normal operation of the radar sensor. Thus only little additional measuring time is required for the determination of the indicator.

The method may be expanded to the use of more than two frequency ramps, for example, by forming a vector of quotients Q(k); for example, in the case of three frequency ramps, a vector of two real quotients: a quotient Q12(k) for the ratio between the first and the second frequency ramps, as well as a quotient Q13(k) for the ratio between the first and the third frequency ramps.

What is claimed is:

1. A method for determining an indicator for a blindness of a radar sensor, comprising:
controlling the radar sensor to (i) transmit a transmission signal in the form of at least two successive frequency ramps having the same ramp slope and in the same frequency range, and (ii) receive detection signals associated with the frequency ramps;

examining, for multiple frequencies, whether a ratio between received powers in the frequency spectra of the received signals, at a respective frequency, corresponds to a ratio between transmission powers of the associated frequency ramps; and determining an indicator for a blindness of the radar sensor based on the result of the examining.

2. The method as recited in claim 1, wherein the examining includes:

determining a discrete frequency spectrum of the received power of the associated detection signals for each of the at least two frequency ramps; and examining, for multiple frequencies, whether a ratio of the received powers in the frequency spectra of the received signals respectively corresponds to a ratio of the transmission powers of the frequency ramps associated with the frequency spectra.

3. The method as recited in claim 1, wherein the examining includes:

determining a discrete frequency spectrum of the received power of the associated detection signals for each of the at least two frequency ramps;

determining at least one succession of quotients of received powers of two detection signals associated with respective frequency ramps, each quotient respectively being calculated from (i) a received power at an individual frequency position of a frequency spectrum of a detection signal, which is associated with a frequency ramp, and (ii) a received power at the same frequency position of a frequency spectrum of a detection signal, which is associated with another frequency ramp; and examining whether the determined quotients correspond to a ratio between the transmission powers of the frequency ramps associated with the frequency spectra.

4. The method as recited in claim 3, further comprising:

determining a mean value of the succession of quotients, and comparing the mean value to the ratio between the transmission powers of the associated frequency ramps.

5. The method as recited in claim 3, wherein, in the step of examining, a measure for scattering of the determined succession of quotients around a quotient of the transmission powers of the associated frequency ramps is taken into account.

6. The method as recited in claim 2, wherein the received powers of at least one of the frequency spectra are normalized according to the ratio between the transmission powers of the associated frequency ramps.

7. The method as recited in claim 2, wherein, in the step of examining, only frequencies with received powers exceeding a threshold value in at least one of the frequency spectra of the receiving signals are examined.

8. The method as recited in claim 2, wherein the at least two frequency ramps of the transmission signal are transmitted directly successively.

9. A radar sensor, comprising:

a control unit including a processor configured to determine an indicator for a blindness of the radar sensor by:

controlling the radar sensor to (i) transmit a transmission signal in the form of at least two successive frequency ramps having the same ramp slope and in the same frequency range, and (ii) receive detection signals associated with the frequency ramps;

examining, for multiple frequencies, whether a ratio between received powers in the frequency spectra of the received signals, at a respective frequency, corresponds to a ratio between transmission powers of the associated frequency ramps; and determining an indicator for a blindness of the radar sensor based on the result of the examining.

10. The method as recited in claim 1, wherein the examining includes comparing the ratio between received powers in the frequency spectra of the received signals to the ratio between transmission powers of the associated frequency ramps.

11. The radar sensor as recited in claim 9, wherein the examining includes comparing the ratio between received powers in the frequency spectra of the received signals to the ratio between transmission powers of the associated frequency ramps.

* * * * *